(12) United States Patent
Zhao et al.

(10) Patent No.: US 12,108,344 B2
(45) Date of Patent: Oct. 1, 2024

(54) METHOD AND DEVICE FOR INDICATING PATH LOSS REFERENCE SIGNAL, TERMINAL, BASE STATION AND STORAGE MEDIUM

(71) Applicant: ZTE CORPORATION, Guangdong (CN)

(72) Inventors: Jiaqi Zhao, Guangdong (CN); Ke Yao, Guangdong (CN); Bo Gao, Guangdong (CN); Hong Chang, Guangdong (CN); Ping Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 385 days.

(21) Appl. No.: 17/619,738

(22) PCT Filed: Jun. 17, 2020

(86) PCT No.: PCT/CN2020/096534
§ 371 (c)(1),
(2) Date: Dec. 16, 2021

(87) PCT Pub. No.: WO2020/253713
PCT Pub. Date: Dec. 24, 2020

(65) Prior Publication Data
US 2022/0361114 A1 Nov. 10, 2022

(30) Foreign Application Priority Data
Jun. 19, 2019 (CN) .......................... 201910530521.0

(51) Int. Cl.
*H04W 52/24* (2009.01)
*H04W 52/14* (2009.01)

(52) U.S. Cl.
CPC ....... *H04W 52/242* (2013.01); *H04W 52/146* (2013.01)

(58) Field of Classification Search
CPC . H04W 52/242; H04W 52/146; H04W 52/00; H04W 52/04; H04W 52/08;
(Continued)

(56) References Cited

U.S. PATENT DOCUMENTS

| 2019/0261320 A1* | 8/2019 | Yu ........................ H04W 56/001 |
| 2019/0349964 A1* | 11/2019 | Liou ..................... H04W 76/27 |

(Continued)

FOREIGN PATENT DOCUMENTS

| CN | 102395184 A | 3/2012 |
| CN | 109151969 A | 1/2019 |

(Continued)

OTHER PUBLICATIONS

Anonymous, "3rd Generation Partnership Project; Technical Specification Group Radio Access Network; NR; Physical layer Procedures of control (Release 15)", 3GPP Standard, Mar. 27, 2019. (Year: 201).*

(Continued)

*Primary Examiner* — Angelica Perez
(74) *Attorney, Agent, or Firm* — Li & Cai Intellectual Property (USA) Office

(57) ABSTRACT

The present application discloses a method and a device for indicating a path loss reference signal, a terminal, a base station and a storage medium. The method for indicating a path loss reference signal includes: receiving an uplink transmission control signaling transmitted by a base station; determining a spatial domain relationship parameter of uplink transmission according to the uplink transmission control signaling; and determining a path loss reference signal used for uplink transmission power control according to the spatial domain relationship parameter of uplink transmission. According to the technical solutions provided by the embodiments, the path loss reference signal is deter- (Continued)

mined according to the spatial domain relationship parameter, which saves signaling overhead, and improves configuration flexibility of a path loss reference signal used for uplink transmission power control.

11 Claims, 5 Drawing Sheets

(58) Field of Classification Search
CPC ... H04W 52/10; H04W 52/12; H04W 52/125; H04W 52/14; H04W 52/143; H04L 5/0051; H04L 5/0053
See application file for complete search history.

(56) References Cited

U.S. PATENT DOCUMENTS

| 2020/0053724 | A1* | 2/2020 | MolavianJazi | ..... H04W 52/146 |
| 2020/0187128 | A1 | 6/2020 | Yao et al. | |
| 2020/0404593 | A1 | 12/2020 | Yao et al. | |
| 2021/0321355 | A1* | 10/2021 | Gao | .............. H04W 56/0045 |
| 2022/0094500 | A1* | 3/2022 | Liu | .............. H04W 52/325 |
| 2023/0370180 | A1* | 11/2023 | Ryu | .............. H04W 24/08 |

FOREIGN PATENT DOCUMENTS

| CN | 109803362 A | 5/2019 |
| CN | 110535605 A | 12/2019 |
| WO | WO2013023551 A1 | 2/2013 |
| WO | WO 2015117018 A1 | 8/2015 |

OTHER PUBLICATIONS

Ericsson, "Miscellaneous non-controversial corrections Set II" 3GPP draft; R2-1908528 dated May 30, 2019. (Year: 2019).*
Anonymous, "3rd Generation Partnership Project; Technical Specification Group Radio Access Network; NR; Physical layer Procedures of control (Release 15)", 3GPP Standard, Mar. 27, 2019. (Year: 2019).*
WIPO, International Search Report issued on Sep. 2, 2020.
Ericsson. "Remaining issues for NR power control," 3GPP TSG-RAN WG1#93, Busan, Korea, May 21-25, 2018.
ZTE. "Summary2 for AI 7.1.5 Maintenance for UL power control," 3GPP TSG RAN WG1 Meeting #96, Athens, Greece, Feb. 25-Mar. 1, 2019.
Ericsson. "Signalling reduction for beam-based UL power control," 3GPP TSG-RAN WG1 Meeting #97, Reno, USA, May 13-May 17, 2019.
European Patent Office, extended European Search Report dated May 26, 2023, for corresponding EP application No. 20826554.6.
ZTE, "Summary 2 for AI 7.1.5 Maintenance for UL power control", 3GPP Draft, R1-1903458 , 3GPP TSG RAN WG1 Meeting #96 , dated Mar. 1, 2019.
Anonymous, "3rd Generation Partnership Project; Technical Specification Group Radio Access Network; NR; Physical layer Procedures of control (Release 15)", 3GPP Standard, Mar. 27, 2019.
Ericsson, "Miscellaneous non-controversial corrections Set II" 3GPP draft; R2-1908528 dated May 30, 2019.
Vivo, "Discussion on physical-layer procedures for UE/gNB measurements" R1-1906180 dated May 1, 2019.
China Patent Office, First office action dated May 9, 2023, for corresponding CN application No. 201910530521.0.

* cited by examiner

METHOD AND DEVICE FOR INDICATING PATH LOSS REFERENCE SIGNAL, TERMINAL, BASE STATION AND STORAGE MEDIUM

The present disclosure claims the priority to the Chinese Patent Application No. 201910530521.0 filed with the CNIPA on Jun. 19, 2019, the entire contents of which are incorporated herein by reference.

TECHNICAL FIELD

Embodiments of the present disclosure relate to, but are not limited to, a method and a device for indicating a path loss reference signal, a terminal, a base station and a storage medium.

BACKGROUND

A high frequency band with an ultra-wide bandwidth (i.e., millimeter wave communication) has become an important direction for the development of future mobile communication and attracted the attention of academia and industry all over the world. In particular, advantages of millimeter waves have become more and more attractive in the face of increasingly congested spectrum resources and massive physical network access. Corresponding standardization works have been carried out by many standards organizations, such as Institute of Electrical and Electronics Engineers (IEEE) and 3rd Generation Partnership Project (3GPP). For example, by virtue of a significant advantage of large bandwidth, high-frequency communication will become an important innovation in 5G New Radio Access Technology (5G New RAT) in the 3GPP.

Existing 5G communication systems are required to support an uplink power control method based on beam pair. However, flexibility of beam parameter configuration of uplink transmission is higher than that of parameter configuration of a path loss reference signal used for uplink transmission power control, which causes a failure to synchronously update a beam relationship of the path loss reference signal used for uplink transmission power control and a beam relationship of target uplink transmission when beam switching occurs in an actual communication system, and thus path loss measurement is unreliable, which is not favorable for uplink power control. In addition, due to the low flexibility of parameter configuration of the path loss reference signal used for uplink transmission power control, Radio Resource Control Reconfiguration (RRC Reconfiguration) needs to be frequently carried out when beam switching occurs, which takes long effective time, incurs huge signaling overhead, and is not favorable for system stability.

SUMMARY

At least one embodiment of the present disclosure provides a method and a device for indicating a path loss reference signal, a terminal, a base station and a storage medium, so as to achieve synchronous update of beam pair information of uplink transmission and beam pair information of a path loss reference signal used for uplink transmission power control.

At least one embodiment of the present disclosure provides a method for indicating a path loss reference signal, including: receiving an uplink transmission control signaling transmitted by a base station; determining a spatial domain relationship parameter of uplink transmission according to the uplink transmission control signaling; and determining a path loss reference signal used for uplink transmission power control according to the spatial domain relationship parameter of uplink transmission.

At least one embodiment of the present disclosure provides a method for indicating a path loss reference signal, including: transmitting an uplink transmission control signaling to a terminal, with a spatial domain relationship parameter of uplink transmission in the uplink transmission control signaling indicating a path loss reference signal used for uplink transmission power control.

At least one embodiment of the present disclosure provides a terminal, including a memory storing a program, and a processor. When the program is read and executed by the processor, the method for indicating a path loss reference signal according to any embodiment is implemented.

At least one embodiment of the present disclosure provides a base station, including a memory storing a program, and a processor. When the program is read and executed by the processor, the method for indicating a path loss reference signal according to any embodiment is implemented.

At least one embodiment of the present disclosure provides a computer-readable storage medium storing one or more programs. The one or more programs are executable by one or more processors to implement the method for indicating a path loss reference signal according to any embodiment.

Compared with the existing art, an embodiment of the present disclosure includes the operations of receiving an uplink transmission control signaling transmitted by a base station; determining a spatial domain relationship parameter of uplink transmission according to the uplink transmission control signaling; and determining a path loss reference signal used for uplink transmission power control according to the spatial domain relationship parameter of uplink transmission. According to the technical solution provided by the embodiment, the path loss reference signal is determined according to the spatial domain relationship parameter, which saves the signaling overhead; and configuration flexibility of the path loss reference signal used for uplink transmission power control is such improved that the configuration flexibility of the path loss reference signal is consistent with beam configuration flexibility of uplink transmission, and the synchronous update of beam pair information of uplink transmission and beam pair information of a path loss reference signal used for uplink transmission power control is achieved.

Other features and advantages of the present disclosure will be described in the following description, and can become partially apparent from the description or be understood through the implementation of the present disclosure. The objectives and the other advantages of the present disclosure can be achieved and obtained through the structures particularly pointed out in the description, claims and drawings.

BRIEF DESCRIPTION OF DRAWINGS

The drawings are intended to provide a further understanding of the technical solutions of the present disclosure, and constitute a part of the description. The drawings together with the embodiments of the present disclosure are intended to explain the technical solutions of the present disclosure, but do not constitute a limitation on the technical solutions of the present disclosure.

DETAIL DESCRIPTION OF EMBODIMENTS

To make the objectives, technical solutions and advantages of the present disclosure more apparent, the embodiments of the present disclosure will be described below with reference to the drawings. It should be noted that the embodiments and the features of the embodiments in the present disclosure can be arbitrarily combined with each other in the case of no conflict.

The operations illustrated in the flowcharts of the drawings can be performed in a computer system such as a set of computer-executable instructions. In addition, although a logical order is illustrated in the flowchart, the operations illustrated or described can be performed in an order different from that described herein in some cases.

Figure 1:
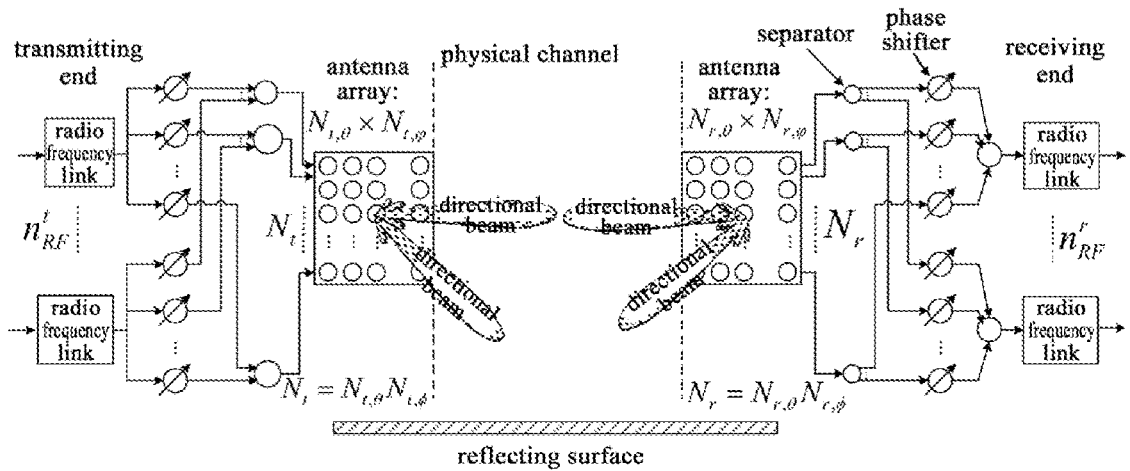
FIG. 1 is a schematic structural diagram of a hybrid analog and digital beamforming transceiver according to an embodiment of the present disclosure.

FIG. 1 is a schematic structural diagram of a hybrid analog and digital beamforming transceiver according to an embodiment of the present disclosure. A transmitting end and a receiving end of the transceiver system are provided with a multi-antenna unit and a plurality of radio frequency links. Each radio frequency link is connected to an antenna array unit (partial connection is not excluded), and each antenna unit is provided with a digital keyed phase shifter. By controlling phase shifts of signals of a plurality of antenna units, analog beamforming of a millimeter wave system is achieved. The hybrid analog and digital beamforming transceiver has a plurality of radio frequency signal streams therein, each of which is loaded with a precoding Antenna Weight Vector (AWV) through the digital keyed phase shifter and is transmitted from the multi-antenna unit to a high-frequency-band physical transmission channel; and at the receiving end, the radio frequency signal streams received by the multi-antenna unit are weighted and combined into a single signal stream which is then subjected to radio frequency demodulation at the receiving end, so that a receiver finally obtains a plurality of received signal streams which are subjected to digital baseband sampling and received. In the embodiment, the transmitting end may be regarded as a base station, and the receiving end may be regarded as a terminal.

A beam may be a kind of resource (e.g., a spatial filter at a transmitting end, a spatial filter at a receiving end, originating precoding, terminating precoding, an antenna port, an AWV and an antenna weight matrix), and a beam sequence number may be replaced with a resource index (e.g., a resource index of reference signal) because the beam may be bound to some time-frequency code resources in transmission. The beam may also be a transmission manner (transmitting/receiving), which may include space division multiplexing, frequency domain/time domain diversity, and the like.

The base station may perform Quasi co-location configuration on two reference signals, and inform the terminal to describe a channel characteristic assumption. Parameters involved in the Quasi co-location at least include: Doppler spread, Doppler shift, delay spread, an average delay, an average gain and a spatial parameter. In the embodiment, the spatial parameter may include a spatial receiving parameter, such as an angle of arrival, a spatial correlation between received beams, an average delay and a correlation between time-frequency channel responses (including phase information).

In addition, the base station may configure a spatial domain relationship for two reference signals, and inform the terminal to describe a channel characteristic assumption. The configuration of the spatial domain relationship includes configuration of a spatial filter.

The reference signal includes at least one of:
1) a Channel State Information Reference Signal (CSI-RS);
2) a Channel State Information Interference Measurement (CSI-IM) Signal;
3) a Demodulation Reference Signal (DMRS);
4) a Downlink Demodulation Reference Signal (DL DMRS);
5) an Uplink Demodulation Reference Signal (UL DMRS);
6) a Sounding Reference Signal (SRS);
7) a Phase-Tracking Reference Signal (PTRS);
8) a Random Access Channel (RACH) Signal;
9) a Synchronization Signal (SS);
10) a Synchronization Signal block (SS block);
11) a Primary Synchronization Signal (PSS); or
12) a Secondary Synchronization Signal (SSS).

An embodiment of the present disclosure provides a method for indicating a path loss reference signal, aiming to achieve the synchronous update of beam pair information of uplink transmission and beam pair information of a path loss reference signal used for uplink transmission power control without incurring extra signaling overhead.

Figure 2:
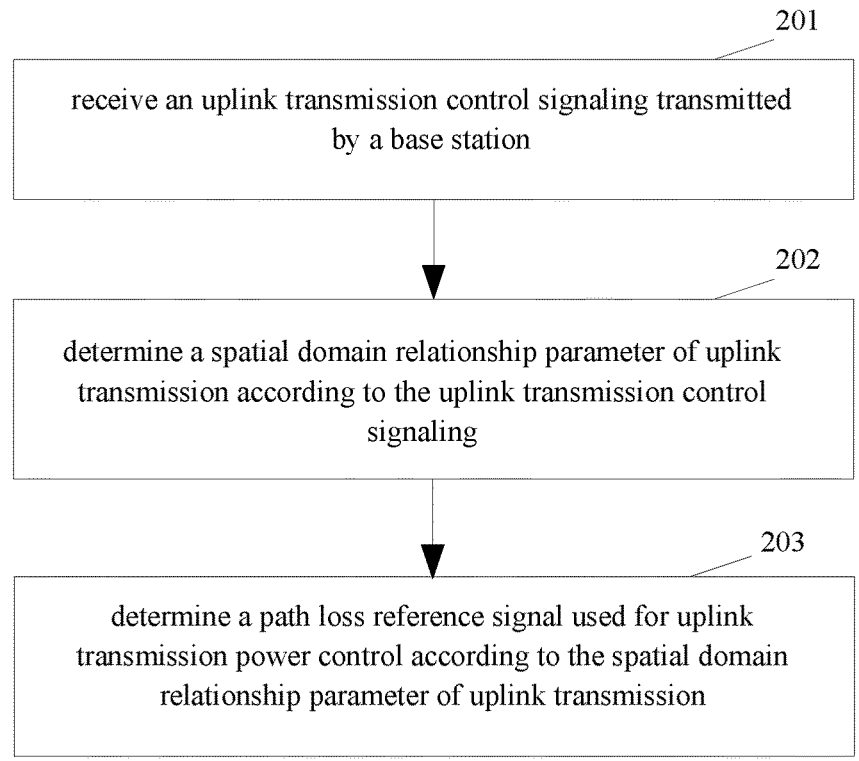
FIG. 2 is a flowchart illustrating a method for indicating a path loss reference signal according to an embodiment of the present disclosure.

FIG. 2 is a flowchart illustrating a method for indicating a path loss reference signal according to an embodiment of the present disclosure. The method is applied to a terminal and includes the following operations 201 to 203.

At the operation 201, an uplink transmission control signaling transmitted by a base station is received.

The terminal receives the uplink transmission control signaling transmitted by the base station, and determines an uplink transmission control parameter based on the uplink transmission control signaling. Exemplarily, the uplink transmission control signaling carries the uplink transmission control parameter, which includes, but is not limited to, a spatial domain relationship parameter of uplink transmission.

The uplink transmission control parameter does not include a path loss reference signal indication. It should be noted that such exclusion of the path loss reference signal indication means that no extra information dedicated to indication of a path reference signal is included. In the embodiment, the spatial domain relationship parameter of uplink transmission is configured to indicate a path loss reference signal.

In an embodiment, the uplink transmission control signaling includes, but is not limited to, at least one of:
a Media Access Control-Control Element (MAC-CE) signaling;
an RRC Setup/Reconfiguration signaling; or
a Downlink Control Information (DCI) signaling.

At the operation 202, the spatial domain relationship parameter of uplink transmission is determined according to the uplink transmission control signaling.

In the operation, the terminal determines the spatial domain relationship parameter of uplink transmission based on the uplink transmission control signaling. Exemplarily, the uplink transmission control signaling carries the spatial domain relationship parameter of uplink transmission, which includes, but is not limited to, a reference signal correlated through a spatial domain relationship. A reference signal correlated with an uplink signal through a spatial domain relationship may be understood as that a spatial filter used to transmit the uplink signal by a terminal is consistent with a spatial filter used to transmit or receive the reference signal.

It should be noted that the spatial domain relationship parameter of uplink transmission may be derived from one or more of the MAC-CE signaling, the DCI signaling and the RRC Setup/Reconfiguration signaling.

At the operation 203, a path loss reference signal used for uplink transmission power control is determined according to the spatial domain relationship parameter of uplink transmission.

According to the technical solution provided by the embodiment, no extra control signaling is needed to indicate the path loss reference signal, which facilitates saving the signaling overhead; RRC reconfiguration is not needed, which facilitates flow stability and improves system robustness; the configuration flexibility of the path loss reference signal used for uplink transmission power control is such improved that the configuration flexibility of the path loss reference signal is consistent with the beam configuration flexibility of uplink transmission; the synchronous update of beam pair information of uplink transmission and beam pair information of a path loss reference signal used for uplink transmission power control is achieved; accuracy of path loss measurement is improved; uplink interference suppression is facilitated; and energy saving at the terminal is facilitated.

In an embodiment, the spatial domain relationship parameter includes a reference signal correlated through a spatial domain relationship; and the operation 203 of determining the path loss reference signal used for uplink transmission power control according to the spatial domain relationship parameter of uplink transmission includes: for any target uplink channel or signal, when a reference signal correlated with the target uplink channel or signal through a spatial domain relationship is a downlink signal, taking the reference signal correlated with the target uplink channel or signal through the spatial domain relationship as a path loss reference signal of the target uplink channel or signal used for transmission power control.

In an embodiment, the spatial domain relationship parameter includes a reference signal correlated through a spatial domain relationship; and the operation 203 of determining the path loss reference signal used for uplink transmission power control according to the spatial domain relationship parameter of uplink transmission includes: for any target uplink channel or signal, when a reference signal correlated with the target uplink channel or signal through a spatial domain relationship is not a downlink signal, taking an $N^{th}$ reference signal which is correlated with the target uplink channel or signal through a multi-level spatial domain relationship and is a downlink signal as a path loss reference signal of the target uplink channel or signal used for transmission power control; and the correlation through the multi-level spatial domain relationship means that (N−1) levels of reference signals exist between the target uplink channel or signal and the $N^{th}$ reference signal, N>1, and from the target uplink channel or signal, a reference signal at each level is correlated with a reference signal at a next level through a spatial domain relationship. Assuming that N=2, that is, the path loss reference signal of the target uplink channel or signal is a second reference signal of the target uplink channel or signal, a first-level reference signal, namely a first reference signal, exists between the target uplink channel or signal and the second reference signal, the target uplink channel or signal is correlated with the first reference signal through a spatial domain relationship, and the first reference signal is correlated with the second reference signal through a spatial domain relationship. As another example, (N−1) levels of reference signals exist between the target uplink channel or signal and the $N^{th}$ reference signal and are a first-level reference signal to an (N−1)-level reference signal sequentially, the target uplink channel or signal is correlated with the first-level reference signal through a spatial domain relationship, the first-level reference signal is correlated with the second-level reference signal through a spatial domain relationship, and so on, and the (N−1)-level reference signal is correlated with the N-level reference signal (i.e., the $N^{th}$ reference signal) through a spatial domain relationship.

In an embodiment of the present disclosure, the target uplink channel or signal includes, but is not limited to, at least one of:
a Physical Uplink Shared Channel (PUSCH);
a Physical Uplink Control Channel (PUCCH);
a Physical Random Access Channel (PRACH);
a Sounding Reference Signal (SRS);
an UL DMRS; or
a PTRS.

For example, the target uplink channel is a PUCCH, a spatial domain relationship parameter of the PUCCH is acquired from an RRC Setup signaling, an acquired reference signal correlated with the PUCCH is CSI-RS #1 which represents a CSI-RS with a resource identifier (Id) of 1, and CSI-RS #1 is a downlink signal, so the reference signal CSI-RS #1 correlated with the PUCCH is taken as a path loss reference signal of the PUCCH used for transmission power control.

Figure 3:
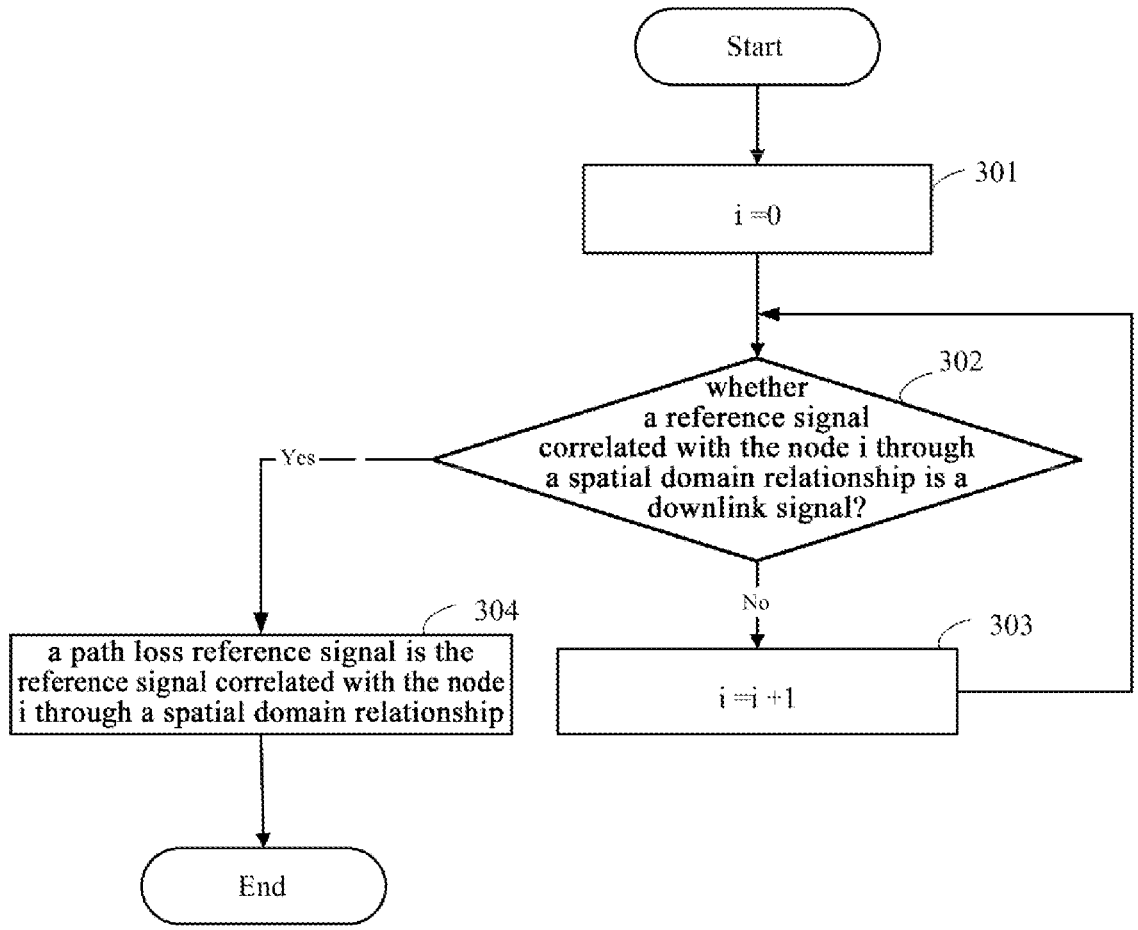
FIG. 3 is a flowchart illustrating a method of determining a path loss reference signal used for power control of uplink transmission according to a reference signal correlated through a spatial domain relationship in the uplink transmission according to an embodiment of the present disclosure.

FIG. 3 is a flowchart illustrating a method of determining a path loss reference signal used for uplink transmission power control by a terminal according to a reference signal correlated with a target uplink channel or signal through a spatial domain relationship according to an embodiment of the present disclosure.

For clarity of description, several nodes are defined in the method, each node represents a signal, and the nodes are correlated with each other through a spatial domain relationship. Specifically, a reference signal correlated with a signal of a parent node through a spatial domain relationship is a signal of a child node of the parent node. A target uplink channel or signal is defined as a root node, a node where a reference signal correlated with the target uplink channel or signal through a spatial domain relationship is located is a child node of the root node, the root node is also a parent node of the child node, and the child node also has a child node correlated therewith through a spatial domain relationship, that is, a reference signal correlated with the parent node through a spatial domain relationship is the child node of the parent node. Each node has a node index value i, and it is defined that the node index value of the target uplink channel or signal is 0 and the node index value of a child node is the node index value of its parent node plus 1. It should be noted that such a definition is only an example, and the node index value may be set otherwise as required.

In the method, from the root node, the terminal traverses each node along a direction from the parent node to the child node until a reference signal correlated with a certain node through a spatial domain relationship, which is found by the terminal, is a downlink signal, then the downlink signal is taken as the path loss reference signal used for uplink transmission power control, and the traversal is ended.

As shown in FIG. 3, the method includes operations 301 to 304.

At operation 301: setting a node index value i to be 0, which indicates a root node.

At operation 302: determining whether a reference signal correlated with the node i through a spatial domain relationship is a downlink signal, and if so, performing operation 304; and performing operation 303 if the correlated reference signal is not a downlink signal.

At operation 303: changing the node index value i to i+1, and returning to the operation 302.

At operation 304, determining that a path loss reference signal of the uplink channel or signal is the reference signal correlated with the node i through the spatial domain relationship, and terminating the process.

In the embodiment, the method of determining the path loss reference signal by the terminal multiplexes the spatial domain relationship parameter in the uplink transmission control signaling, so as to bind a beam relationship of the target uplink transmission channel or signal and a beam relationship of the path loss reference signal of the target uplink transmission channel or signal. When beam switching occurs, the beam relationship of the path loss reference signal of the target uplink transmission channel or signal is synchronously switched, with no need for extra signaling indication.

Figure 4:
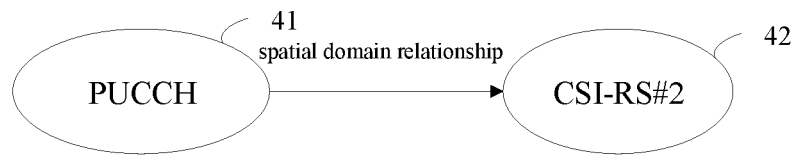
FIG. 4 is an example of determining a path loss reference signal used for power control of uplink transmission according to a reference signal correlated through a spatial domain relationship in the uplink transmission in the present disclosure.
Figure 5:
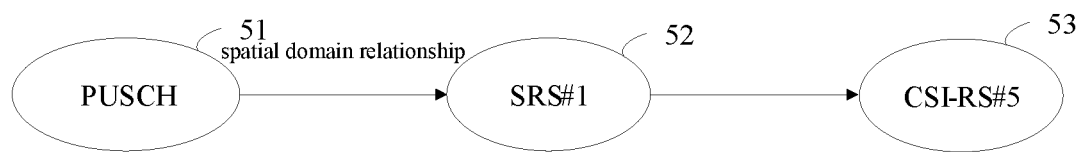
FIG. 5 is another example of determining a path loss reference signal used for power control of uplink transmission according to a reference signal correlated through a spatial domain relationship in the uplink transmission in the present disclosure.
Figure 6:
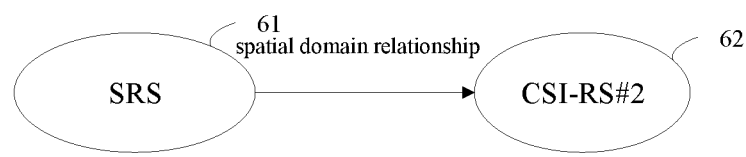
FIG. 6 is still another example of determining a path loss reference signal used for power control of uplink transmission according to a reference signal correlated through a spatial domain relationship in the uplink transmission in the present disclosure.

For illustration, FIGS. 4, 5 and 6 are three examples of determining a path loss reference signal.

As shown in FIG. 4, for transmission of a PUCCH, the PUCCH is a root node 41 (with a node index value i=0), a reference signal correlated with the PUCCH through a spatial domain relationship is CSI-RS #2 (representing a CSI-RS with a resource Id=2), namely a node 42 (with a node index value i=1), and the reference signal is a downlink signal, so the terminal indicates that CSI-RS #2 is a path loss reference signal of the PUCCH used for transmission power control.

As shown in FIG. 5, for transmission of a PUSCH, the PUSCH is a root node 51 (with a node index value i=0), a reference signal correlated with the PUSCH through a spatial domain relationship is SRS #1 (representing an SRS with a resource Id=1), and the reference signal is an uplink signal. Therefore, the terminal traverses a child node of the reference signal, namely a node 52 (with a node index i=1) which is a first reference signal, a reference signal correlated with the node 52 (SRS #1) through a spatial domain relationship is CSI-RS #5 (a node 53 with a node index value i=2), the node 53 is a second reference signal, and the second reference signal is a downlink signal, so CSI-RS #5 is taken as a path loss reference signal of the PUSCH used for transmission power control. In the example, the second reference signal is taken as the path loss reference signal, and the target uplink channel and the path loss reference signal are correlated with each other through a two-level spatial domain relationship, and one level of reference signal (i.e., the first reference signal) exists therebetween.

It should be noted that the spatial domain relationship parameter of the PUSCH (the reference signal correlated with the PUSCH) and the spatial domain relationship parameter of the SRS (the reference signal correlated with the SRS) may be carried in different uplink transmission control signalings. For example, one is carried in a DCI signaling, and the other is carried in an RRC Setup signaling.

As shown in FIG. 6, for transmission of an SRS, the SRS is a root node 61 (with a node index value i=0), a reference signal correlated with the SRS through a spatial domain relationship is CSI-RS #2 (a node 62 with a node index value i=1), and the reference signal is a downlink signal, so CSI-RS #2 is taken as a path loss reference signal of the SRS used for transmission power control.

Figure 7:
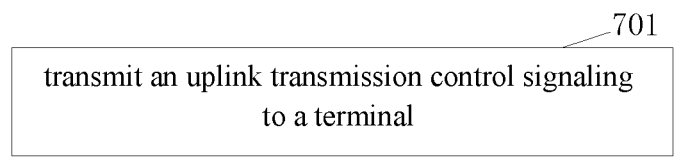
FIG. 7 is a flowchart illustrating another method for indicating a path loss reference signal provided by the present disclosure.

FIG. 7 is a flowchart illustrating another method for indicating a path loss reference signal according to an embodiment of the present disclosure. The method is applied to a base station and includes operations 701.

At operation 701: transmitting an uplink transmission control signaling to a terminal, with a spatial domain relationship parameter of uplink transmission in the uplink transmission control signaling indicating a path loss reference signal used for uplink transmission power control.

The base station transmits the uplink transmission control signaling to the terminal, and indicates an uplink transmission control parameter to the terminal based on the uplink transmission control signaling.

The uplink transmission control signaling includes, but is not limited to: 1) a MAC-CE signaling; 2) an RRC Setup/Reconfiguration signaling; and 3) a DCI signaling.

The uplink transmission control parameter includes, but is not limited to, the spatial domain relationship parameter of uplink transmission.

The uplink transmission control parameter does not include a path loss reference signal indication. It should be noted that such exclusion of the path loss reference signal indication means that no extra information dedicated to indication of a path reference signal is included. In the embodiment, the spatial domain relationship parameter of uplink transmission is configured to indicate a path loss reference signal.

In an embodiment, the spatial domain relationship parameter includes a reference signal correlated through a spatial domain relationship; and the operation of indicating the path loss reference signal used for uplink transmission power control by the spatial domain relationship parameter of uplink transmission in the uplink transmission control signaling includes: for any target uplink channel or signal, when a reference signal correlated with the target uplink channel or signal through a spatial domain relationship is a downlink signal, taking the reference signal correlated with the target uplink channel or signal through the spatial domain relationship as a path loss reference signal of the target uplink channel or signal used for transmission power control.

In an embodiment, the spatial domain relationship parameter includes a reference signal correlated through a spatial domain relationship; and the operation of indicating the path loss reference signal used for uplink transmission power control by the spatial domain relationship parameter of uplink transmission in the uplink transmission control signaling includes: when a reference signal correlated with a target uplink channel or signal through a spatial domain relationship is not a downlink signal, taking an $N^{th}$ reference signal which is correlated with the target uplink channel or signal through a multi-level spatial domain relationship and is a downlink signal as a path loss reference signal of the target uplink channel or signal used for transmission power control; and the correlation through the multi-level spatial domain relationship means that (N−1) levels of reference signals exist between the target uplink channel or signal and the $N^{th}$ reference signal, N>1, and from the target uplink channel or signal, a reference signal at each level is correlated with a reference signal at a next level through a spatial domain relationship.

Figure 8:
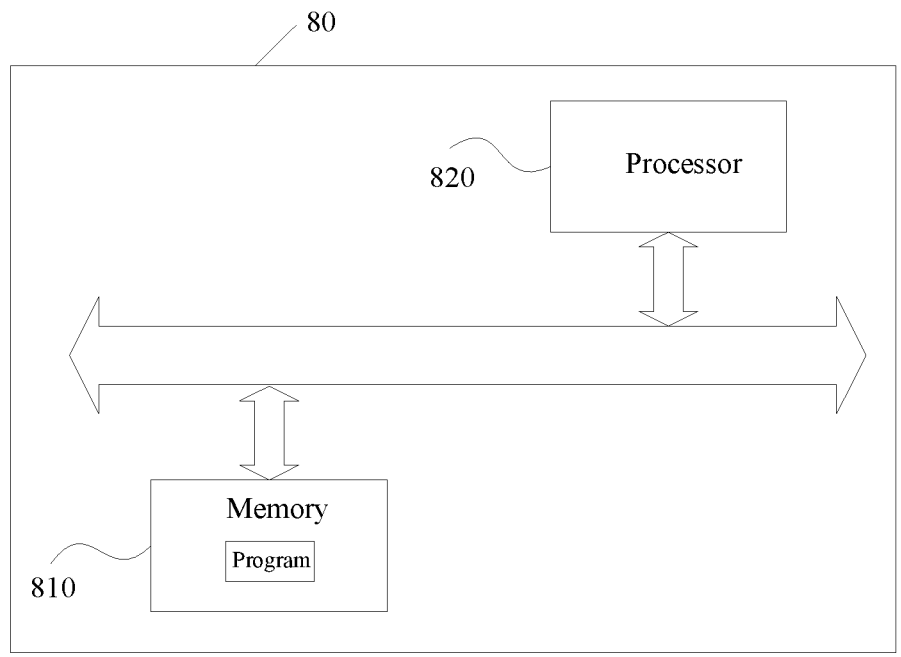
FIG. 8 is a block diagram of a terminal according to an embodiment of the present disclosure.

As shown in FIG. 8, an embodiment of the present disclosure provides a terminal 80, which includes a memory 810 storing a program, and a processor 820. When the program is read and executed by the processor 820, the method for indicating a path loss reference signal according to any embodiment is implemented. It should be noted that the method for indicating a path loss reference signal here refers to the method for indicating a path loss reference signal applied to a terminal side.

Figure 9:
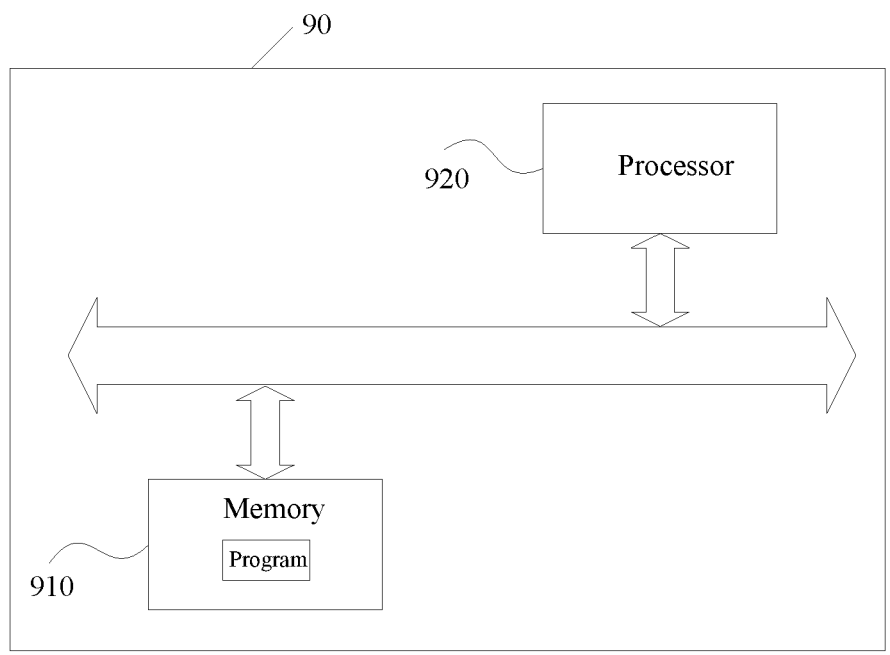
FIG. 9 is a block diagram of a base station according to an embodiment of the present disclosure.

As shown in FIG. 9, an embodiment of the present disclosure provides a base station 90, which includes a memory 910 storing a program, and a processor 920. When the program is read and executed by the processor 920, the method for indicating a path loss reference signal according to any embodiment is implemented. It should be noted that the method for indicating a path loss reference signal here refers to the method for indicating a path loss reference signal applied to a base station side.

Figure 10:
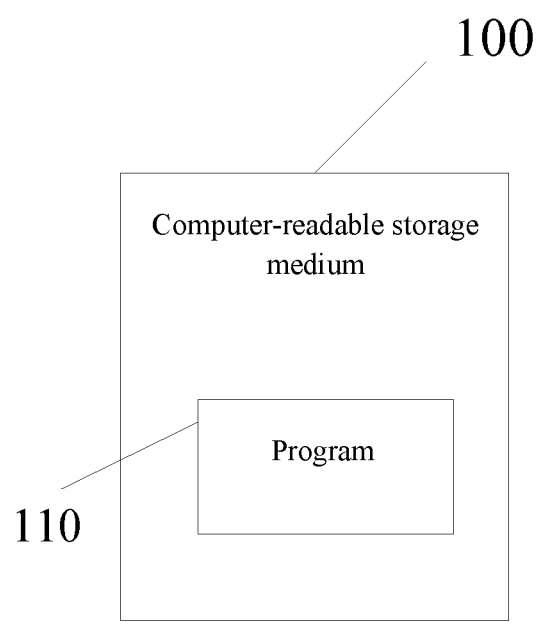
FIG. 10 is a block diagram of a computer-readable storage medium according to an embodiment of the present disclosure.

As shown in FIG. 10, an embodiment of the present disclosure provides a computer-readable storage medium 100 storing one or more programs 110. The one or more programs 110 are executable by one or more processors to implement the method for indicating a path loss reference signal according to any embodiment.

It should be understood by those of ordinary skill in the art that the functional modules/units in all or some of the operations, the systems and the devices in the methods disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the components may be implemented as software executed by a processor, such as a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

What is claimed is:

1. A method for indicating a path loss reference signal, comprising:
    receiving an uplink transmission control signaling transmitted by a base station;
    determining a spatial domain relationship parameter of uplink transmission according to the uplink transmission control signaling, the spatial domain relationship parameter comprising a reference signal correlated through a spatial domain relationship; and
    determining a path loss reference signal used for uplink transmission power control according to the spatial domain relationship parameter of uplink transmission,
    wherein the determining the path loss reference signal used for uplink transmission power control according to the spatial domain relationship parameter of uplink transmission comprises:
    for any target uplink channel or signal,
    in a case where a reference signal correlated with the target uplink channel or signal through a spatial domain relationship is a downlink signal, taking the reference signal correlated with the target uplink channel or signal through the spatial domain relationship as a path loss reference signal of the target uplink channel or signal used for transmission power control,
    in a case where a reference signal correlated with the target uplink channel or signal through a spatial domain relationship is not a downlink signal, taking an $N^{th}$ reference signal which is correlated with the target uplink channel or signal through a multi-level spatial domain relationship and is a downlink signal as a path loss reference signal of the target uplink channel or signal used for transmission power control, wherein the correlation through the multi-level spatial domain relationship means that (N−1) levels of reference signals exist between the target uplink channel or signal and the $N^{th}$ reference signal, N>1, and from the target uplink channel or signal, a reference signal at each level is correlated with a reference signal at a next level through a spatial domain relationship.

2. The method of claim 1, wherein the target uplink channel or signal comprises at least one of: a Physical Uplink Shared Channel, a Physical Uplink Control Channel, a Physical Random Access Channel, a Sounding Reference Signal, an Uplink Demodulation Reference Signal, or a Phase-Tracking Reference Signal.

3. The method of claim 1, wherein the uplink transmission control signaling comprises at least one of: a Media Access Control-Control Element signaling, a Radio Resource Control Setup/Reconfiguration signaling, or a Downlink Control Information signaling.

4. A terminal, comprising a memory storing a program, and a processor, wherein, when the program is read and executed by the processor, the method for indicating a path loss reference signal of claim 1 is implemented.

5. A non-transitory computer-readable storage medium storing at least one program, wherein the at least one program is executable by at least one processor to implement the method for indicating a path loss reference signal of claim 1.

6. The method of claim 1, wherein the reference signal correlated with an uplink channel or signal through the spatial domain relationship refers to that a spatial filter for transmitting the uplink channel or signal is consistent with a spatial filter for transmitting or receiving the reference signal.

7. A method for indicating a path loss reference signal, comprising:
transmitting an uplink transmission control signaling to a terminal,
wherein a spatial domain relationship parameter of uplink transmission in the uplink transmission control signaling is used for determining a path loss reference signal used for uplink transmission power control;
the spatial domain relationship parameter comprises a reference signal correlated through a spatial domain relationship; and
the determining the path loss reference signal used for uplink transmission power control by using the spatial domain relationship parameter of uplink transmission in the uplink transmission control signaling comprises:
for any target uplink channel or signal,
in a case where a reference signal correlated with the target uplink channel or signal through a spatial domain relationship is a downlink signal, taking the reference signal correlated with the target uplink channel or signal through the spatial domain relationship as a path loss reference signal of the target uplink channel or signal used for transmission power control,
in a case where a reference signal correlated with the target uplink channel or signal through a spatial domain relationship is not a downlink signal, taking an $N^{th}$ reference signal which is correlated with the target uplink channel or signal through a multi-level spatial domain relationship and is a downlink signal as a path loss reference signal of the target uplink channel or signal used for transmission power control, wherein the correlation through the multi-level spatial domain relationship means that (N−1) levels of reference signals exist between the target uplink channel or signal and the $N^{th}$ reference signal, N>1, and from the target uplink channel or signal, a reference signal at each level is correlated with a reference signal at a next level through a spatial domain relationship.

8. The method of claim 7, wherein the uplink transmission control signaling comprises at least one of:
a Media Access Control-Control Element signaling, a Radio Resource Control Setup/Reconfiguration signaling, or a Downlink Control Information signaling.

9. A base station, comprising a memory storing a program, and a processor, wherein, when the program is read and executed by the processor, the method for indicating a path loss reference signal of claim 7 is implemented.

10. A non-transitory computer-readable storage medium storing at least one program, wherein the at least one program is executable by at least one processor to implement the method for indicating a path loss reference signal of claim 7.

11. The method of claim 7, wherein the reference signal correlated with an uplink channel or signal through the spatial domain relationship refers to that a spatial filter for transmitting the uplink channel or signal is consistent with a spatial filter for transmitting or receiving the reference signal.

* * * * *